United States Patent [19]
Nakao

[11] Patent Number: 6,134,249
[45] Date of Patent: *Oct. 17, 2000

[54] INFORMATION TRANSFERRING SYSTEM USING IDLE CELLS

[75] Inventor: Shigeharu Nakao, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/613,294

[22] Filed: Mar. 11, 1996

[30] Foreign Application Priority Data

Mar. 10, 1995 [JP] Japan ............................ 7-050753

[51] Int. Cl.$^7$ ............................................. H04J 3/14
[52] U.S. Cl. .................................... 370/528; 370/395
[58] Field of Search .................... 370/389, 392, 370/395, 396, 397, 398, 399, 412, 522, 528, 252, 241

[56] References Cited

U.S. PATENT DOCUMENTS

| | | | |
|---|---|---|---|
| 5,557,609 | 9/1996 | Shobatake et al. | 370/395 |
| 5,570,361 | 10/1996 | Norizuki et al. | 370/528 |
| 5,621,722 | 4/1997 | Edmaier et al. | 370/397 |
| 5,634,097 | 5/1997 | Ashi et al. | 370/397 |
| 5,663,959 | 9/1997 | Nakagawa | 370/528 |

*Primary Examiner*—Huy D. Vu
*Attorney, Agent, or Firm*—Ostrolenk, Faber, Gerb & Soffen, LLP

[57] ABSTRACT

An information transfer system includes circuit packages each being connected in cascade through a transmission line. An input cell stream including idle cells is transferred through the transmission line from an input circuit package to an output circuit package. The idle cells of the cell stream are used to transfer necessary control information to the circuit packages through the transmission line. In the input circuit package, a control cell is generated which includes a plurality of control signals each including the control information and specifying information. The control information set is inserted into an idle cell detected from the input cell stream to produce a multiplex cell stream. Each circuit package is provided with an information detector which detects its own control information from the multiplex cell stream based on the specifying information.

30 Claims, 4 Drawing Sheets

2

INFORMATION TRANSFERRING SYSTEM USING IDLE CELLS

BACKGROUND OF THE INVENTION

1. Field of the Invention

The present invention generally relates to information transferring systems, and in particular to a system which transfers information to a plurality of circuit packages.

2. Description of the Related Art

A system having a complicated function is frequently a combination of many circuit units each having a relatively simple function. Such an arrangement causes the design and maintenance of the system to be simplified, and further the changing and addition of functions can easily be made. Hereinafter, the above circuit unit each having a relatively simple function is referred to as a circuit package. A typical example is a communication system such as a switching system. The switching system is designed to transfer respective signals from incoming lines to designated outgoing lines through a lot of circuit packages.

In order to control all the circuit packages incorporated in the communication system, it is necessary to transfer control signals to the respective circuit packages. Therefore, a conventional system is provided with a lot of control signal lines in addition to data lines within the system frame.

However, a wiring problem arises with the conventional arrangement were complicated communication systems are involved, such as with the increasingly widespread use of communication terminals, in that the number of circuit packages and control signal lines are increased.

SUMMARY OF THE INVENTION

An object of the present invention is to provide a information transfer system which enables the information transfer to circuit packages with simplified wiring.

Another object of the present invention is to provide an information transfer system which can reduce the number of signal lines included therein.

Still another object of the present invention is to provide an information transfer method which enables supplying information to a cascade-connected circuit packages while transferring the information from the input circuit package to the output circuit package through a single transmission line.

According to the present invention, idle blocks of an information block stream are used to transfer necessary information to a predetermined collection of circuit packages provided in an communication apparatus through a single transmission line.

More specifically, an information transfer system comprises a plurality of circuit packages each performing a predetermined operation according to first information and being provided with predetermined identification number. Further, the circuit packages are connected in cascade through the transmission line. An input information block stream including idle blocks is transferred through the transmission line from an input circuit package to an output circuit package.

The input circuit package is provided with an information generator which generates an information set comprising a predetermined number of signals each including a first information for a single circuit package and second information for specifying the single circuit package. The first information set is inserted into an idle block detected from the input information block stream to produce an internal information block stream. The internal information block stream is transferred through the transmission line from the input circuit package to an output circuit package. An information detector provided in the input circuit package detects the first information for the input circuit package from the internal information block stream by comparing the predetermined identification data to the second information. Similarly, the respective other circuit packages are also provided with information detectors each detecting the first information for the circuit package in question from the internal information block stream by comparing the its own identification data to the second information.

The system is further comprised of a restoring circuit for restoring the internal information block stream to an original state of the input information block stream. More specifically, the restoring circuit may be an information eraser for erasing the first information set from the idle block. Alternatively, the restoring circuit is a converter for converting the first information set into the original idle block.

DETAILED DESCRIPTION OF THE PREFERRED EMBODIMENTS

Taking a communication apparatus used in an ATM (Asynchronous Transfer Mode) system as an example, an embodiment of the present invention will be described hereinafter.

Figure 1:
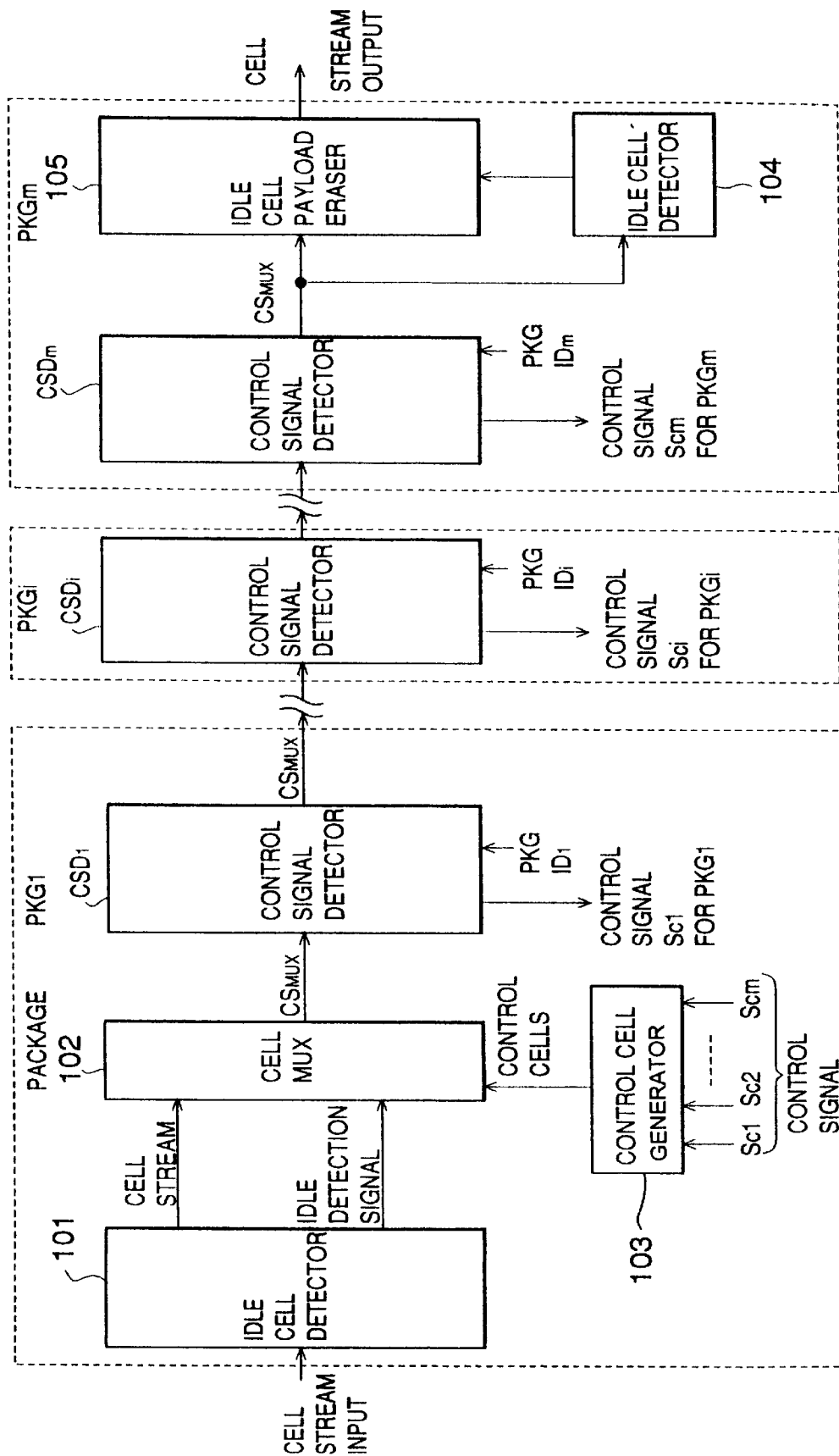
FIG. 1 is a block diagram showing the configuration of an information transfer system according to an embodiment of the present invention.

Referring to FIG. 1, the communication apparatus is comprised of a plurality of circuit packages $PKG_1$–$PKG_m$ which are connected in cascade through a transmission line. A cell stream is received by the input circuit package $PKG_1$ and is sequentially transferred to the output circuit package $PKG_m$ through the circuit packages $PKG_2$–$PKG_{m-1}$. The cell stream includes valid cells, OM (Operation and Maintenance) control cells, and idle cells, where the OM control cells are used to manage the network between communication apparatuses.

The respective circuit packages $PKG_1$–$PKG_m$ are provided with processing circuits each performing a predetermined function under the control of a system controller (not shown). The control signals generated by the system controller are provided to the input circuit package $PKG_1$ and travel over the transmission line to the output circuit package $PKG_m$ by using idle cells included in the cell stream.

According to this embodiment, the input circuit package $PKG_1$ is comprised of an idle cell detector 101, a cell multiplexer 102, a control cell generator 103, and a control signal detector $CSD_1$. The idle cell detector 101 receives the cell stream including idle cells each having no valid data in its payload, and outputs the cell stream and an idle detection signal to the cell multiplexer 102. The idle detection signal indicates the detection timing of idle cells in the cell stream. The cell multiplexer 102 multiplexes the valid cells of the cell stream and PKG control cells together according to the idle detection signal to output a multiplex cell stream $CS_{MUX}$ to the control signal detector $CSD_1$. The control cell generator 103 receives the control signals $S_{c1}$-$S_{cm}$ from the system controller and assembles the PKG control cells from the control signals to output them to the cell multiplexer 102. The respective control signals $S_{c1}$-$S_{cm}$ are to be provided to the circuit packages $PKG_1$-$PKG_m$. Each PKG control cell is designed to have a predetermined number of control signals each accompanied with a predetermined package identification number $ID_i$ on its payload (see FIGS. 4 and 5). The header of each PKG control cell may be identical to that of an idle cell. Alternatively, the header of each PKG control cell may be a unique pattern so as to be discriminated from other cells. In this embodiment, the header of each PKG control cell is assumed to be identical to that of an idle cell.

The control signal detector $CSD_1$ detects the control signal $S_{c1}$ from the multiplex cell stream $CS_{MUX}$ using a predetermined package identification number $ID_1$ and transfers the multiplex cell stream $CS_{MUX}$ to the next circuit package $PKG_2$. The circuit package $PKG_2$ is also provided with a control signal detectors $CSD_2$ having the same function as the control signal detector $CSD_1$. Similarly, the circuit packages $PKG_3$-$PKG_m$ following the control signal detectors $CSD_2$ are provided with control signal detectors $CSD_3$-$CSD_m$ having the same function, respectively. Therefore, the respective control signal detectors $CSD_2$-$CSD_m$ of the circuit packages $PKG_2$-$PKG_m$ detect the control signals $S_{c2}$-$S_{cm}$ from the multiplex cell stream $CS_{MUX}$ using the predetermined package identification numbers $ID_2$-$ID_m$.

The output circuit package $PKG_m$ is comprised of an idle cell detector 104 and an idle cell payload restorer 105 in addition to the control signal detector $CSD_m$. The idle cell detector 104 detects the timing of idle cells from the multiplex cell stream $CS_{MUX}$. According to the idle detection signal received from the idle cell detector 104, the idle cell payload eraser 105 erases the contents of the payload of each idle cell. In other words, the idle cell payload eraser 105 converts each idle cell of the multiplex cell stream $CS_{MUX}$ into its original state.

In this manner, the control signals packed into the payload of an idle cell at the input circuit package $PKG_1$ travel over the transmission line while being detected at the respective circuit packages $PKG_2$-$PKG_{m-1}$, and finally are erased at the output circuit package $PKG_m$.

Figure 2:
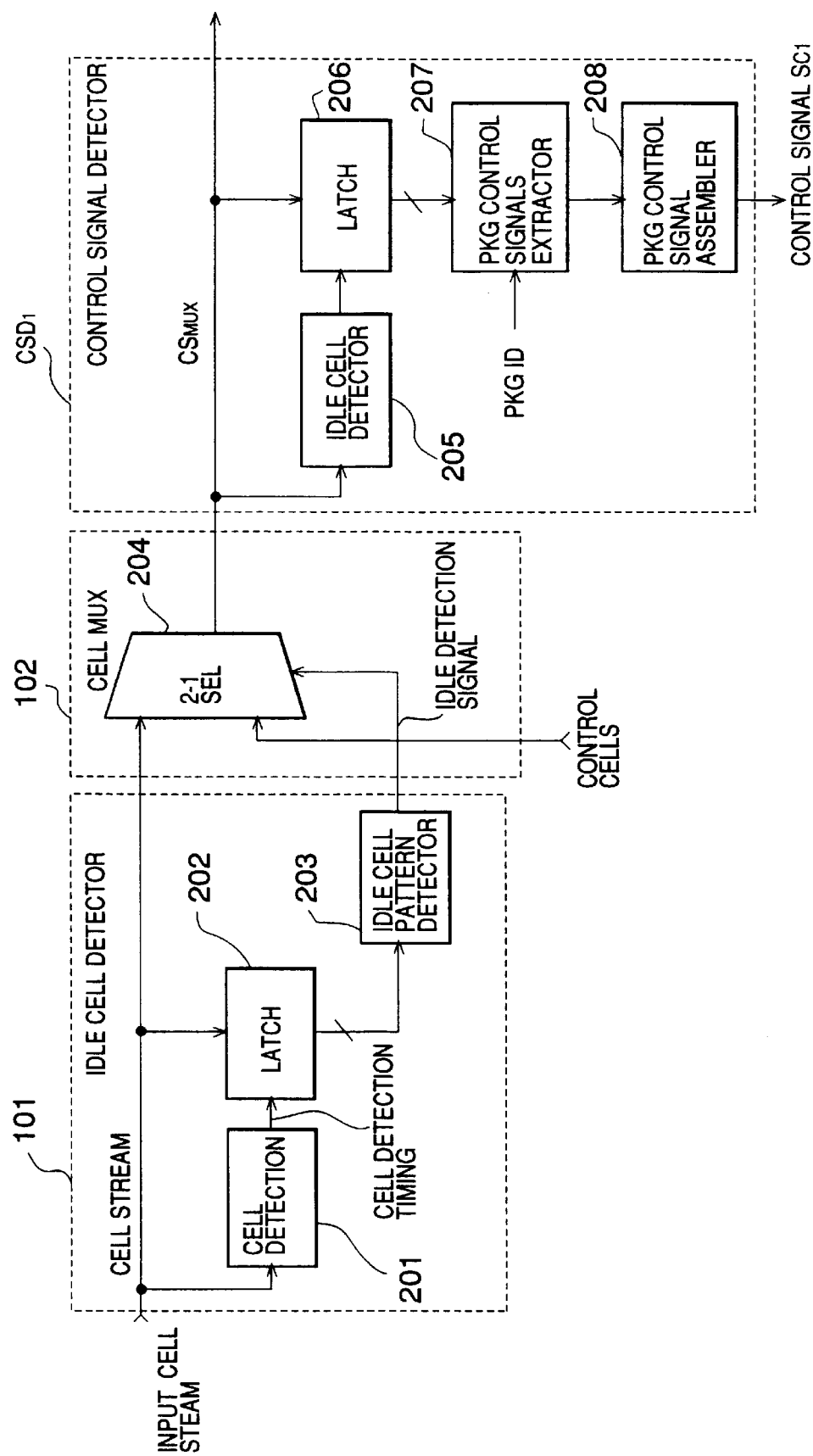
FIG. 2 is a detailed block diagram showing an example of the input circuit package in the embodiment as shown in FIG. 1.

Referring to FIG. 2, a more detailed description about the input circuit package $PKG_1$ will be provided. The idle cell detector 101 is comprised of a cell detector 201, a latch 202, and an idle cell pattern detector 203. The cell detector 201 detects the timing of cells from the input cell stream and outputs a cell detection timing signal to the latch 202. The latch 202 stores a bit pattern of the header of each cell at the timing of the cell detection timing signal received from the cell detector 201. The idle cell pattern detector 203 reads the bit pattern from the latch 202 and compares it with a predetermined bit pattern of the header of an idle cell. When the bit pattern stored in the latch 202 coincides with the predetermined bit pattern of an idle cell, the idle cell pattern detector 203 outputs the idle detection signal of the value '0' to the cell multiplexer 102 (see FIG. 3).

The cell multiplexer 102 is comprised of a selector 204 which normally selects the cell stream but a control cell only when receiving the idle detection signal from the idle cell detector 101. In other words, the control cells generated by the control cell generator 103 are inserted one by one into the time slots of idle cells and thereby the multiplex cell stream $CS_{MUX}$ is produced.

The control signal detector $CSD_1$ is comprised of an idle cell detector 205, a latch 206, a PKG control signal extractor 207, and a control signal assembler 208. The idle cell detector 205 is the same circuit configuration as the idle cell detector 101. It should be noted that the idle cell detectors 104 also have the same circuit as the idle cell detector 101. The latch 206 stores the payload data of an idle cell from the multiplex cell stream $CS_{MUX}$ at the time when receiving the idle detection signal from the idle cell detector 205. The PKG control signal extractor 207 reads the payload data from the latch 206 and searches for a control signal for this circuit package $PKG_1$ using the package identification number $ID_1$ as a keyword. When finding the control signal of its own, the PKG control signal extractor 207 outputs the control signal to the control signal assembler 208. If the control signal $S_{c1}$ is divided into two or more pieces or cells, the control signal assembler 208 assembles the received control signals to form the control signal $S_{c1}$.

Since the other control signal detectors $CSD_2$-$CSD_m$ have the same circuit configuration as the control signal detectors $CSD_1$, each control signal detectors $CSD_i$ detects a control signal $S_{ci}$ for the circuit package $PKG_i$ from the multiplex cell stream $CS_{MUX}$ using the package identification number $Id_i$ as described above.

Figure 3:
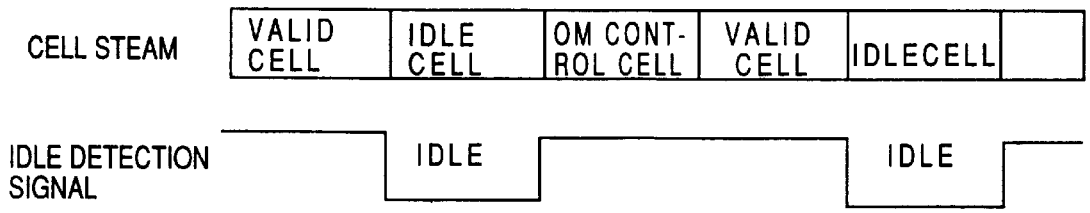
FIG. 3 is a schematic diagram showing an example of a cell stream and idle cell detection timing of the cell stream.

As shown in FIG. 3, the input cell stream includes valid cells, OM control cells, and idle cells. The idle cell detector 101 of the input circuit package PKG1 detects idle cells from the cell stream to produce the idle detection signal which is normally high but goes low when an idle cell is detected. Therefore, the selector 204 of the cell multiplexer 102 selects a control cell when the idle detection signal is low.

The 48-byte payload of an idle cell may be divided into a desired number of areas depending on the amount of control data or the number of control signals.

Figure 4:
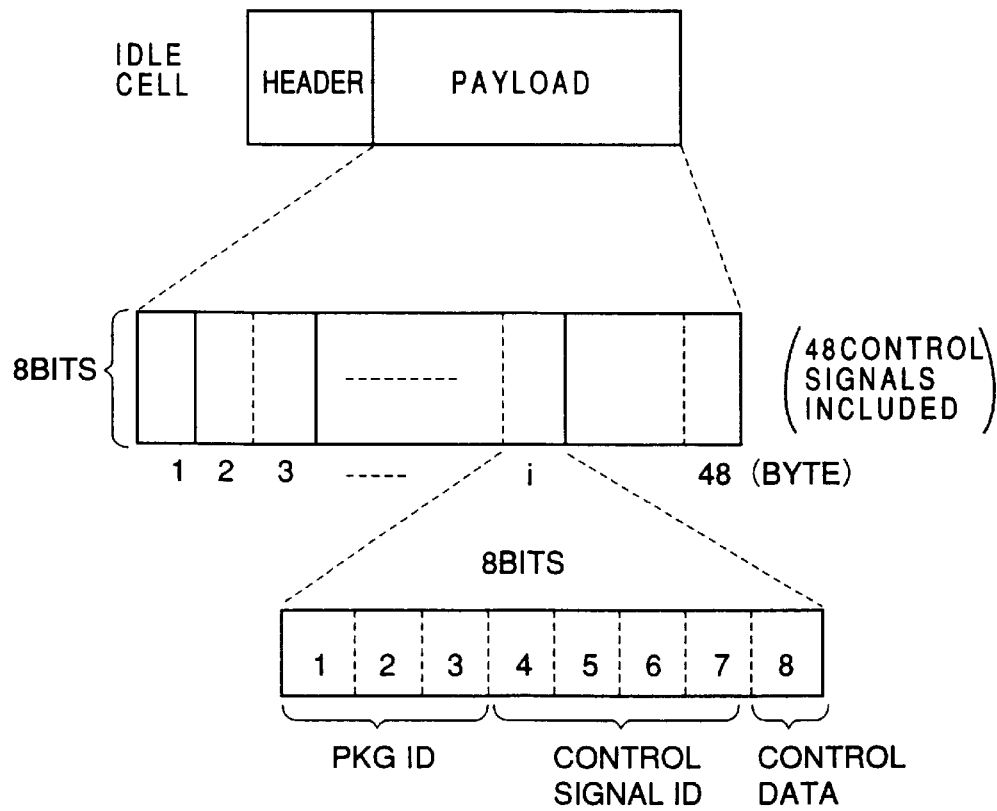
FIG. 4 is a schematic diagram showing a first example of the idle cell format according to the embodiment.

As illustrated in FIG. 4, the 48-byte payload of an idle cell may be divided into 48 8-bit areas, where each area of the payload corresponds to a single control signal. For instance, the i-th byte consists of 3-bit PKG identification number, 4-bit control signal identification, and 1-bit control data. The PKG control signal extractor 207 of each control signal detector $CSD_i$ extracts the control signal ID and the control data for the circuit package $PKG_i$ from the latch 206 when the 3-bit PKG identification number coincides with the predetermined package identification number $ID_i$.

Figure 5:
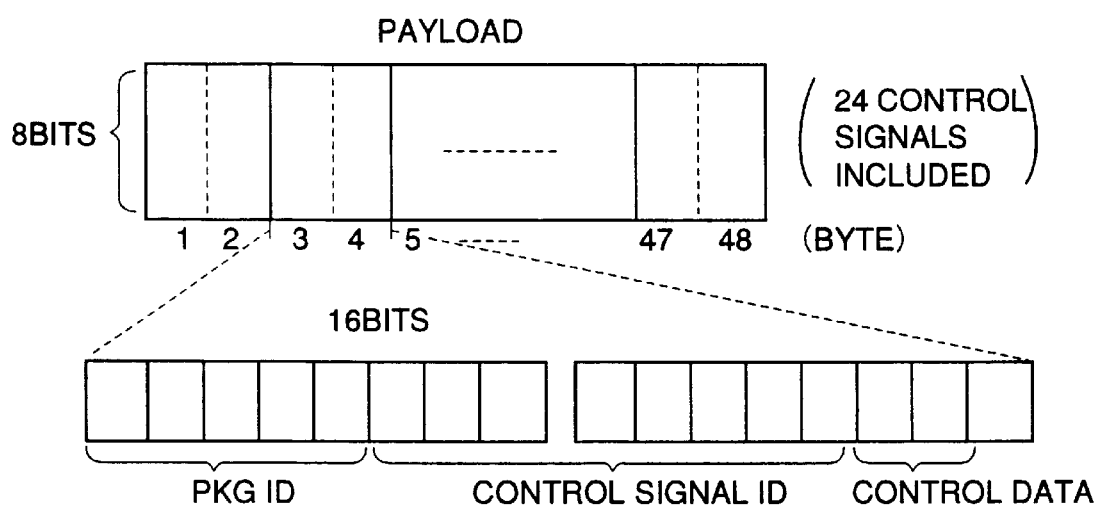
FIG. 5 is a schematic diagram showing a second example of the idle cell format according to the embodiment.

As shown in FIG. 5, the 48-byte payload of an idle cell may be divided into 24 16-bit areas, where each area of the payload corresponds to a single control signal. For instance, the i-th area consists of 5-bit PKG identification number, 8-bit control signal identification, and 3-bit control data. The PKG control signal extractor 207 of each control signal detector $CSD_i$ extracts the control signal ID and the control data for the circuit package $PKG_i$ from the latch 206 when the 5-bit PKG identification number coincides with the predetermined package identification number $ID_i$. As descrived above, the number of areas for storing control signals may be determined as necessary.

It should be noted that the header of each PKG control cell may be a unique pattern so as to be discriminated from other cells, that is, valid cells, control cells, and idle cells. In this case, the respective control signal detectors $CSD_2$-$CSD_m$ have a PKG control cell detector instead of the idle cell detector 205. The PKG control cell detector is easily made by replacing the idle cell pattern detector 203 with a PKG control cell pattern detector.

What is claimed is:

1. An information transferring apparatus within a communication system for transferring an information block stream having valid cells containing valid data and idle cells containing no valid data, the information transferring apparatus comprising:

a plurality of serially connected circuit packages including an input circuit package and an output circuit package, the circuit packages being connected such that the information block stream is transferred serially through each of the circuit packages from the input circuit package to the output package, wherein the input circuit package comprises:

an idle cell detector which detects idle cells in the information block stream; and an information inserter which inserts control information into the detected idle cells; and wherein the output circuit package comprises a restorer to restore the detected idle cells having control information inserted therein to the idle cells as originally contained in the information block stream such that the information block stream exiting from the output circuit package is substantively identical to the information block stream prior to being transferred into the input circuit package.

2. The information transferring apparatus according to claim 1, wherein each of said plurality of circuit packages performs a specific operation according to a respective control signal, and said control information includes a plurality of control signals and identification information associated with each of the plurality of control signals to identify the circuit package to perform an operation specified in the associated control signal.

3. The information transferring apparatus according to claim 2, wherein the input circuit package further comprises a control cell generator which generates said plurality of control signals and associated identification information to specify a plurality of operations to be performed and to identify a circuit package to perform each of the plurality of operations.

4. The information transferring apparatus according to claim 2, wherein each of the plurality of circuit packages is assigned a package identification to enable extraction of the control signal or signals addressed to said each circuit package, and each of the plurality of circuit packages including an extractor which extracts said control signal or signals addressed to said each circuit package by matching said package identification with the identification information associated with each of the plurality of control signals.

5. The apparatus according to claim 4, wherein each circuit package further includes a latch for storing the control information inserted into the idle cells detected from the information block stream.

6. The apparatus according to claim 4, wherein each circuit package further includes an assembler for assembling the control signals extracted in the extractor to form an integrated control signal.

7. The apparatus according to claim 1, wherein the information inserter comprises a multiplexer for multiplexing the information block stream and the control information such that the control information is written into the idle cells.

8. The apparatus according to claim 1, wherein the information inserter comprises a selector for selecting one of the information block stream and the control information such that the information block stream is selected unless an idle cell is detected from the information block stream.

9. The information transferring apparatus according to claim 1, wherein the control information comprises at least one control signal and wherein said idle cells are each dividable into a number of information areas such that each of said at least one control signal may be written into one of said number of information areas.

10. The apparatus according to claim 1, wherein the restorer is an information eraser which erases the control information from the idle cells having control information inserted therein.

11. The apparatus according to claim 1, wherein the information block stream is an ATM (Asynchronous Transfer Mode) cell stream, and said information transferring system is a node within an ATM transmission system.

12. A method for serially transferring an information block stream containing control information through each of a plurality of circuit packages including an input circuit package and an output circuit package, the information block stream comprising valid cells containing valid data and idle cells containing non-valid data, the method comprising the steps of:

inputting the information block stream into the input circuit package;

detecting idle cells in the information block stream;

generating control information to be inserted into the detected idle cells;

inserting the control information into the detected idle cells in the information block stream;

serially transferring the information block stream having the control information inserted into the detected idle cells through each of the plurality of serially connected circuit packages from the input circuit package to the output circuit package; and restoring the detected idle cells having control information inserted therein to the idle cells as originally contained in the information block stream, such that the information block stream exiting from the output circuit package is substantively identical to the information block stream prior to being transferred into the input circuit package.

13. The method according to claim 12, wherein each of the plurality of circuit packages performs a specific operation according to a respective control signal, and said generated control information includes a plurality of control signals and identification information associated with each of the plurality of control signals to identify the circuit package to perform an operation specified in the associated control signal.

14. The method according to claim 13, wherein each of the plurality of circuit packages is assigned a package identification, and the method further comprises the step of extracting the control signal or signals addressed to each of the plurality of circuit packages by matching the assigned package identification for said each circuit package with the identification information associated with each of the plurality of control signals.

15. The method according to claim 12, wherein the restoring step comprises erasing the control information from the idle cells having control information inserted therein.

16. A communication system for transferring an information block stream having valid cells containing valid data and idle cells containing no valid data, the communication system comprising:

a plurality of information transferring apparatuses, each of the plurality of information transferring apparatuses comprising a plurality of serially connected circuit packages including at least an input circuit package and an output circuit package, the circuit packages being connected such that the information block stream is transferred serially through each of the circuit packages from the input circuit package to the output package, the input circuit package including an idle cell detector which detects idle cells in the information block stream; and an information inserter which inserts control information into the detected idle cells; and the output circuit package including a restorer to restore the detected idle cells having control information inserted therein to the idle cells as originally contained in the information block stream such that the information block stream exiting from the output circuit package of each information transferring apparatus is substantively identical to the information block stream prior to being transferred into the input circuit package of said each information transferring apparatus.

17. The communication system according to claim 16, wherein each of the plurality of circuit packages in each information transferring apparatus performs a specific operation according to a respective control signal, and the control information includes a plurality of control signals and identification information associated with each of the plurality of control signals to identify the circuit package within the respective information transferring apparatus to perform an operation specified in the associated control signal.

18. The communication system according to claim 17, wherein the input circuit package in each information transferring apparatus further comprises a control cell generator which generates the plurality of control signals and associated identification information to specify a plurality of operations to be performed and to identify a circuit package within the respective information transferring apparatus to perform each of the plurality of operations.

19. The communication system according to claim 17, wherein each of the plurality of circuit packages in each information transferring apparatus is assigned a package identification to enable extraction of the control signal or signals addressed to the respective circuit package, and each of the plurality of circuit packages in each information transferring apparatus including an extractor which extracts the control signal or signals addressed to the respective circuit package by matching the package identification with the identification information associated with each of the plurality of control signals.

20. The communication system according to claim 19, wherein each circuit package in each information transferring apparatus further includes a latch for storing the control information inserted into the idle cells detected from the information block stream.

21. The communication system according to claim 19, wherein each circuit package in each information transferring apparatus further includes an assembler for assembling the control signals extracted in the extractor of the respective information transferring apparatus to form an integrated control signal.

22. The communication system according to claim 16, wherein the information inserter in each information transferring apparatus comprises a multiplexer for multiplexing the information block stream and the control information such that the control information is written into the idle cells.

23. The communication system according to claim 16, wherein the information inserter in each information transferring apparatus comprises a selector for selecting one of the information block stream and the control information such that the information block stream is selected unless an idle cell is detected from the information block stream.

24. The communication system according to claim 16, wherein the control information comprises at least one control signal and wherein the idle cells are each dividable into a number of information areas such that each of the at least one control signal may be written into one of the number of information areas.

25. The communication system according to claim 16, wherein the restorer of each information transferring apparatus is an information eraser which erases the control information from the idle cells having control information inserted therein.

26. The communication system according to claim 16, wherein the information block stream is an ATM (Asynchronous Transfer Mode) cell stream, the communication system is an ATM transmission system, and each information transferring apparatus is a node within the ATM transmission system.

27. A method for serially transferring an information block stream containing control information through each of a communication system comprising a plurality of information transferring apparatuses, each of the information transferring apparatuses comprising a plurality of circuit packages including at least an input circuit package and an output circuit package, the information block stream comprising valid cells containing valid data and idle cells containing non-valid data, the method comprising the steps of:

transferring the information block stream into a first information transferring apparatus;

inputting the information block stream into the input circuit package of the first information transferring apparatus;

detecting idle cells in the information block stream;

inserting control information into the detected idle cells in the information block stream;

serially transferring the information block stream having the control information inserted into the detected idle cells through each of the plurality of serially connected circuit packages of the first information transferring apparatus from the input circuit package to the output circuit package;

restoring the detected idle cells having control information inserted therein to the idle cells as originally contained in the information block stream, such that the information block stream exiting from the output circuit package of the first information transferring apparatus is substantively identical to the information block stream prior to being transferred into the respective input circuit package of the first information transferring apparatus; and transferring the information block stream into a first information transferring apparatus.

28. The method according to claim 27, wherein each of the plurality of circuit packages of each information transferring apparatus performs a specific operation according to a respective control signal, and the generated control information includes a plurality of control signals and identification information associated with each of the plurality of control signals to identify the circuit package within the first information transferring apparatus to perform an operation specified in the associated control signal.

29. The method according to claim 28, wherein each of the plurality of circuit packages of each information transferring apparatus is assigned a package identification, and the method further comprises the step of extracting the control signal or signals addressed to each of the plurality of circuit packages in the first information transferring apparatus by matching the assigned package identification for the respective circuit package with the identification information associated with each of the plurality of control signals.

30. The method according to claim 27, wherein the restoring step comprises erasing the control information from the idle cells having control information inserted therein.

* * * * *